US008464278B2

(12) United States Patent
Nesamoney et al.

(10) Patent No.: US 8,464,278 B2
(45) Date of Patent: *Jun. 11, 2013

(54) METHOD FOR PERFORMING REAL-TIME ANALYTICS USING A BUSINESS RULES ENGINE ON REAL-TIME HETEROGENEOUS MATERIALIZED DATA VIEWS

(75) Inventors: Diaz H. Nesamoney, Atherton, CA (US); Vaikom B. Krishnan, Fremont, CA (US); Martin L. Handwerker, Palo Alto, CA (US); Nasrollah Jazayeri, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/243,557

(22) Filed: Oct. 1, 2008

(65) Prior Publication Data
US 2009/0031327 A1    Jan. 29, 2009

Related U.S. Application Data

(63) Continuation of application No. 10/446,338, filed on May 27, 2003, now Pat. No. 7,448,048.

(51) Int. Cl.
*G06F 13/00* (2006.01)
(52) U.S. Cl.
USPC ....................................... 719/318; 707/999.1
(58) Field of Classification Search
USPC ........................................ 719/318; 707/999.1
See application file for complete search history.

(56) References Cited

U.S. PATENT DOCUMENTS

| 5,706,495 | A | 1/1998 | Chadha et al. |
| 6,112,198 | A | 8/2000 | Lohman et al. |
| 6,272,502 | B1 | 8/2001 | Lieuwen et al. |
| 6,289,335 | B1 | 9/2001 | Downing et al. |
| 6,292,803 | B1 | 9/2001 | Richardson et al. |
| 6,480,836 | B1 | 11/2002 | Colby et al. |
| 6,480,842 | B1 | 11/2002 | Agassi et al. |
| 6,505,188 | B1 | 1/2003 | Ghazal et al. |
| 6,598,039 | B1 | 7/2003 | Livowsky |
| 6,681,230 | B1 | 1/2004 | Blott et al. |
| 6,725,287 | B1 | 4/2004 | Loeb et al. |
| 6,768,987 | B1 * | 7/2004 | Couch et al. ........... 707/999.002 |

(Continued)

OTHER PUBLICATIONS

U.S. Appl. No. 10/446,336, filed May 27, 2003 entitled "Method for Providing a Real Time View of Heterogeneous Enterprise Data" by Nesamoney et al.

(Continued)

*Primary Examiner* — Andy Ho
(74) *Attorney, Agent, or Firm* — Shumaker & Sieffert, P.A.

(57) ABSTRACT

A method for performing real-time analytics using a business rules engine on real time heterogeneous materialized data views is disclosed. The method comprises processing of rows produced by views corresponding to events. The rows are processed according to business rules by a view engine. Views with conditions equivalent to rule conditions are subscribed to by a rule engine, which outputs action messages corresponding to the rule condition. Where the rule condition is satisfied, a statement to that effect is sent, with any available reportlets, to an alert engine. The alert engine handles alert states corresponding to the action statement, saves any corresponding reportlets, and generates a message to fire an alert to a notification engine. The notification engine formats the alert and sends the alert by a selected medium, such as email, a webservice call, or another network protocol.

26 Claims, 6 Drawing Sheets

U.S. PATENT DOCUMENTS

| | | |
|---|---|---|
| 6,785,673 B1 | 8/2004 | Fernandez et al. |
| 6,882,977 B1 | 4/2005 | Miller |
| 7,043,727 B2 | 5/2006 | Bennett et al. |
| 7,124,204 B2 | 10/2006 | Givoly et al. |
| 7,139,844 B2 | 11/2006 | Smith et al. |
| 7,440,963 B1 | 10/2008 | Bello et al. |
| 7,448,048 B1 | 11/2008 | Nesamoney et al. |
| 2002/0060696 A1 | 5/2002 | Seetharaman et al. |
| 2002/0062237 A1 | 5/2002 | Matsumoto et al. |
| 2002/0194095 A1 | 12/2002 | Koren |
| 2003/0018506 A1 | 1/2003 | McLean et al. |
| 2003/0033179 A1 | 2/2003 | Katz et al. |
| 2003/0097367 A1* | 5/2003 | Ma et al. ............... 707/999.102 |
| 2003/0144828 A1* | 7/2003 | Lin ............................... 703/21 |
| 2003/0187984 A1 | 10/2003 | Banavar et al. |
| 2003/0212789 A1 | 11/2003 | Hamel et al. |
| 2003/0225769 A1 | 12/2003 | Chkodrov et al. |
| 2003/0225820 A1 | 12/2003 | Chkodrov et al. |
| 2003/0227479 A1 | 12/2003 | Mizrahi et al. |
| 2003/0236860 A1* | 12/2003 | Yegin ........................... 709/218 |
| 2004/0019684 A1 | 1/2004 | Potter et al. |
| 2004/0030739 A1 | 2/2004 | Yousefizadeh |
| 2004/0034661 A1 | 2/2004 | Barron et al. |
| 2004/0128342 A1 | 7/2004 | Maes et al. |
| 2004/0186860 A1 | 9/2004 | Lee et al. |
| 2004/0267828 A1 | 12/2004 | Zwilling et al. |
| 2005/0091180 A1 | 4/2005 | Peleg et al. |
| 2005/0198614 A1 | 9/2005 | Mavashev et al. |
| 2005/0278341 A1 | 12/2005 | Kostadinov et al. |
| 2006/0116984 A1 | 6/2006 | Zurek |
| 2007/0130113 A1 | 6/2007 | Ting |
| 2008/0043256 A1 | 2/2008 | Broda et al. |
| 2008/0101369 A1 | 5/2008 | Sandoz et al. |

OTHER PUBLICATIONS

U.S. Appl. No. 10/749,317, filed Dec. 31, 2003 entitled "A Method and System for Dynamically Joining Views That Share a Common Key in a Streaming Database System" by Yan et al.

U.S. Appl. No. 10/750,507, filed Dec. 31, 2003 entitled "A Method and System for Dynamically Initializing a View for a Streaming Data Base System" by Yan et al.

U.S. Appl. No. 60/941,166, filed May 31, 2007 entitled "Streaming Multidimensional Data by Bypassing Multidimensional Query Processor" by Gupta.

Office Action from related U.S. Appl. No. 12/400,626 dated Nov. 8, 2011 (19 pages).

Response to Office Action from related U.S. Appl. No. 12/400,626 dated Nov. 8, 2011 (16 pages) filed on Feb. 7, 2012.

Amendment in response to Office Action dated Apr. 25, 2012 from U.S. Appl. No. 12/400,626, filed Jul. 24, 2012 (16 pages).

Office Action from U.S. Appl. No. 12/400,626 dated Apr. 25, 2012 (20 pages).

Microsoft Windows 2000 Administrator's Pocket Consultant; excerpt from Chapter 3, Feb. 12, 2000; 3 pages.

Office Action from related U.S. Appl. No. 12/400,626 dated Dec. 21, 2012 (20 pages).

\* cited by examiner

METHOD FOR PERFORMING REAL-TIME ANALYTICS USING A BUSINESS RULES ENGINE ON REAL-TIME HETEROGENEOUS MATERIALIZED DATA VIEWS

This application is a continuation of U.S. application Ser. No. 10/446,338, filed May 27, 2003 and entitled "METHOD FOR PERFORMING REAL-TIME ANALYTICS USING A BUSINESS RULES ENGINE ON REAL-TIME HETEROGENOUS MATERIALIZED DATA VIEWS," the entire content of which is incorporated herein by reference.

FIELD OF THE INVENTION

The present invention relates to the field of business intelligence and analytics. More specifically, embodiments of the present invention relates to a method for performing real-time analytics using a business rules engine on heterogeneous materialized real-time data views.

BACKGROUND ART

Business intelligence and data warehousing software enable information from disparate parts of an enterprise to be obtained with relative ease. Great decision-making benefits are generated by business intelligence (BI). BI software integrates querying, reporting, on-line analytic processing (OLAP), data mining, and data warehousing functionality.

Such decision-making benefits are also provided by BI software because they enable a user to process information from as many databases as comprise a business (or other) organization's data storage resources. Further, BI software allows analysis of needed transactions and summaries, without having to know which databases, servers, and/or other information sources from which the information underpinning such transactions and summaries were derived.

By way of background with respect to the applications to business and other enterprises, an 'event' represents a business event, which is a business activity, transaction, or a change in the state of a business entity, for instance, in a large business. Implicitly, events comprise a time of occurrence and an identity. Examples of events include, but are not limited to, issuing a purchase order, taking a customer service call, replenishing supplies, issuing a forecast, and posting an expense item.

A 'context' represents data associated with an event. Typically, contexts are data that are descriptive of the events. A context can also comprise historic summary data, which can be available in a data warehouse or operational data store (ODS). Context data may also be obtained from other systems of record. Context data provides additional information that may be required for adding meaning to an event. Context data, in so far as it can be conventionally utilized, can be evaluated to ascertain whether or not a given event should trigger a heightened state of scrutiny and observation by analysts of the business environment in which a business or other enterprise is immersed.

Modern businesses face significant and increasing needs to obtain real time access to key business events. This need, for instance, can be expressed as a requirement from a business person that indicates that the certain business metrics need to be monitored in real-time or that when certain changes in these metrics caused by various business events imply adverse conditions or an opportunity, this is cause for an 'alert', e.g., notation of event occurrence, and heightened monitoring of associated data thereafter.

The event, for example could be an increase in call volume into a call center, inventory falling below a certain threshold level, a drop in a demand forecast, increase in the number of returns of a certain product, or that defect rates from a test system exceeded pre-specified limits, etc. At the occurrence of such an event, the business person may want a corresponding alert to attract and guide her/his attention.

Conventional reporting and analysis software (variously called Business Intelligence, Query and reporting tools, Data warehouses etc.) ("BI software") all provide reporting and analysis of business data. They do so by either executing queries directly against operational systems or by extracting and transforming in batches, operational data to an independent data store (sometimes called a data warehouse or data mart).

The above method by conventional reporting software results in the usage of a fixed (or static) data model from which data is analyzed. As a result of that, alert conditions cannot be detected without repeatedly running the reports on the data model, often resulting in poor performance of reports or an impact on the operational system itself, if reports are being run directly on it. In addition since the data is often extracted in batches, the resulting metrics are often hours to days old and therefore unsuitable for real-time analytics.

Some conventional reporting products contain alerting technology, however the alerting is based on repeated processing of batch data and on a fixed data model that is inflexible to the needs of real-time analytics.

Other mechanisms, also called event management software provides for alert conditions to be detected and alerts sent, however, it similarly uses fixed data models and batch updates to the data model and suffers the associated drawbacks described above.

Without event processing capabilities and the ability to combine events with context, and powerful business rules processing capability, the ability of a business organization or a similar organization utilizing BI software to engage in real time data analysis is limited. Lacking ability to engage in real time data analysis, a business organization or a similar organization utilizing BI software has only a limited capability at best to react instantaneously to changes in its business and to the business environment in which it operates.

SUMMARY OF THE INVENTION

A method for performing real-time analytics using a business rules engine on heterogeneous data views is disclosed. The method for monitoring a business activity using materialized real time views of heterogeneous enterprise data comprises specifying an alert level for conditions characterizing a real time event. A data element related to the real time event is processed by a business rule. An occurrence of the event in real time is detected where the occurrence indicates that the alert level specified has been reached. The business rule into which the data element has been translated is executed, and an alert corresponding to the business rule is generated.

In one embodiment, the alert is generated in an end user interaction system. The end user interaction system can be any of a number of media, including, but not limited to, voice, e-mail, facsimile, wireless, a web browser, a query and reporting tool, an annunciator, a personal digital assistant, a portal, and an application. The business rule can be created in a business rule language. The alert level for conditions characterizing a real time event can be specified in various media including, but not limited to, a visual interface and a business rules language interface.

In one embodiment, the event comprises a data element and the business rules language uses a construct to refer to the data element. The occurrence of the event in real time can be detected by a probe into the real-time stream of data materialized in the views. The alert corresponding to the business rule is generated with minimal latency after upon being detected.

DETAILED DESCRIPTION

Figure 1:
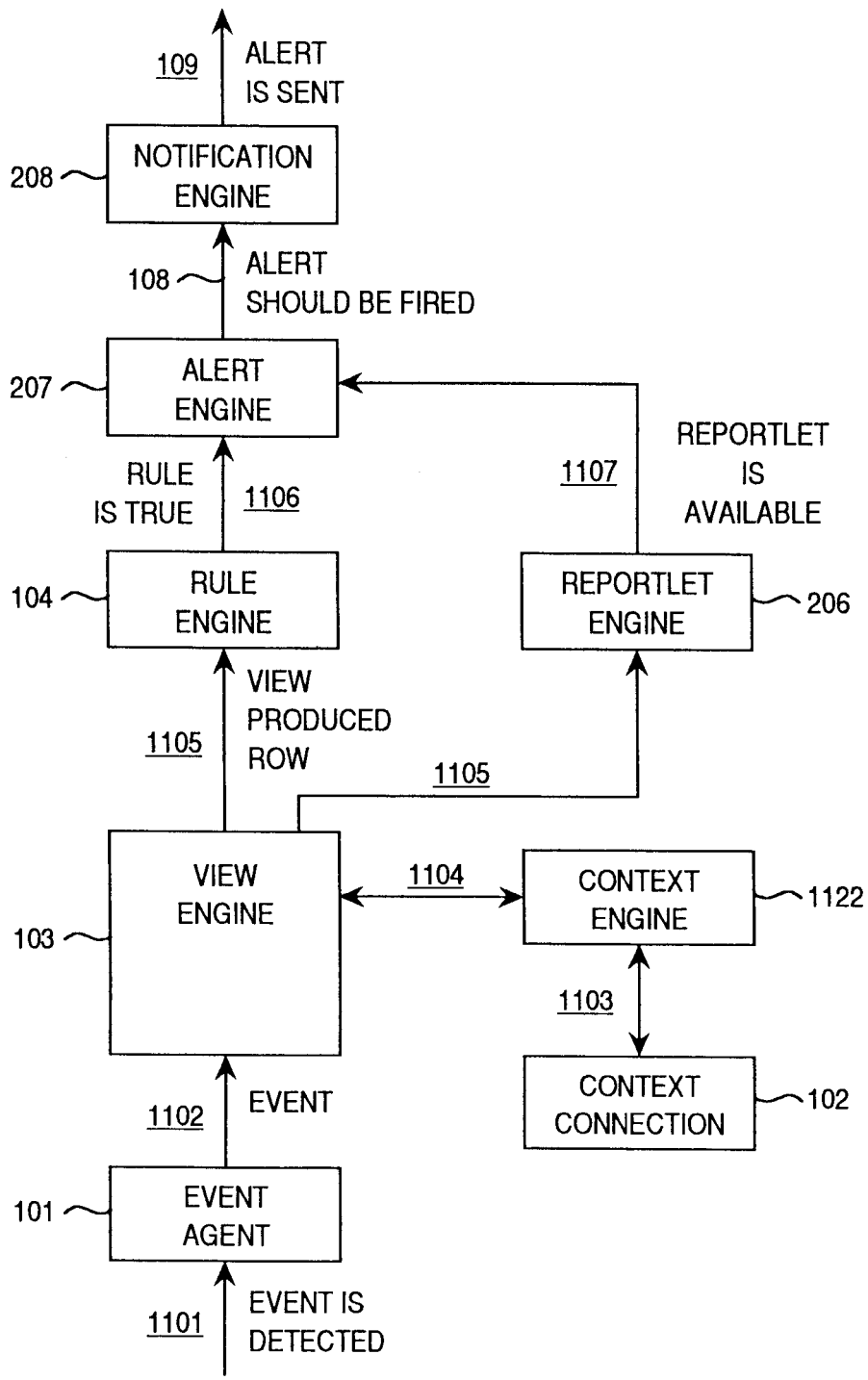
FIG. 1 depicts a system for generating a real time view of heterogeneous enterprise data, according to one embodiment of the present invention.

A system and method for performing real time analytics using a business rules engine on real-time heterogeneous materialized views is disclosed. In one embodiment, the system and method for performing real time analytics using a business rules engine on real-time heterogeneous materialized views applies a method and/or a system described in co-pending U.S. application Ser. No. 10/446,336, entitled "Method for Providing a Real Time View of Heterogeneous Enterprise Data," by Diaz H. Nesamoney, et al., and assigned to the assignee of the present invention, which is hereby incorporated by reference herein in its entirety.

In the following detailed description of an embodiment of the present invention, a system and method for performing real time analytics using a business rules engine on real-time heterogeneous materialized views, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Embodiments of the present invention are directed to system and method for performing real time analytics using a business rules engine on real-time heterogeneous materialized views. The system comprises an event-driven alert generator. Upon an agent detecting an event, a real-time view of the event is materialized, for instance as a row or series of rows. Context, such as historical data relevant to the event, can be added to the materialized view. The view can reach a reportlet view. The materialized views are processed according to a business rule, along with any available reportlets. Where the view satisfies the business rule, an alert is requested. Upon formatting (and adding any available reportlets), the alert is sent via email, a web page, persistently, or by another mode, including another network protocol.

A business or another enterprise using the system for performing real time analytics using a business rules engine on heterogeneous materialized views achieves the capability to monitor an event in context. Thus, the business or similar organization can effectively engage in real-time data analysis. Engaging in such analysis greatly increases the organization's effectiveness at reacting nearly instantaneously to changes in its business and to the business environment in which it operates.

Notation and Nomenclature

As the terms are used herein, the following terms can have meanings comprising the following definitions. An 'event' is any change in the value of a critical data element in a transactional system that must be captured for the purpose of monitoring its value.

A 'context' is additional information added to an event to make it easier and/or more profitable to analyze the event to determine whether action is needed. 'Event context' is the combination of an event view with a context. An event context can be an entity on which an end user alerting business rule is built. Event context appears in one embodiment as a simple view in Structured Query Language (SQL), for purposes of defining rules for alert generation. Context can comprise, for example, historical data.

Exemplary Event to Alert Process

FIG. 1 depicts a process by which events enter a system 100, which can comprise a business activity monitoring (BAM) system, contexts are queried, and formatted alerts with reportlets are sent out of the system, according to one embodiment of the present invention. Process 100 begins with step 1101, wherein event agent 101 detects an event. Upon detecting an event, event agent 102 provides the event to view engine 103 in step 1102.

Figure 2:
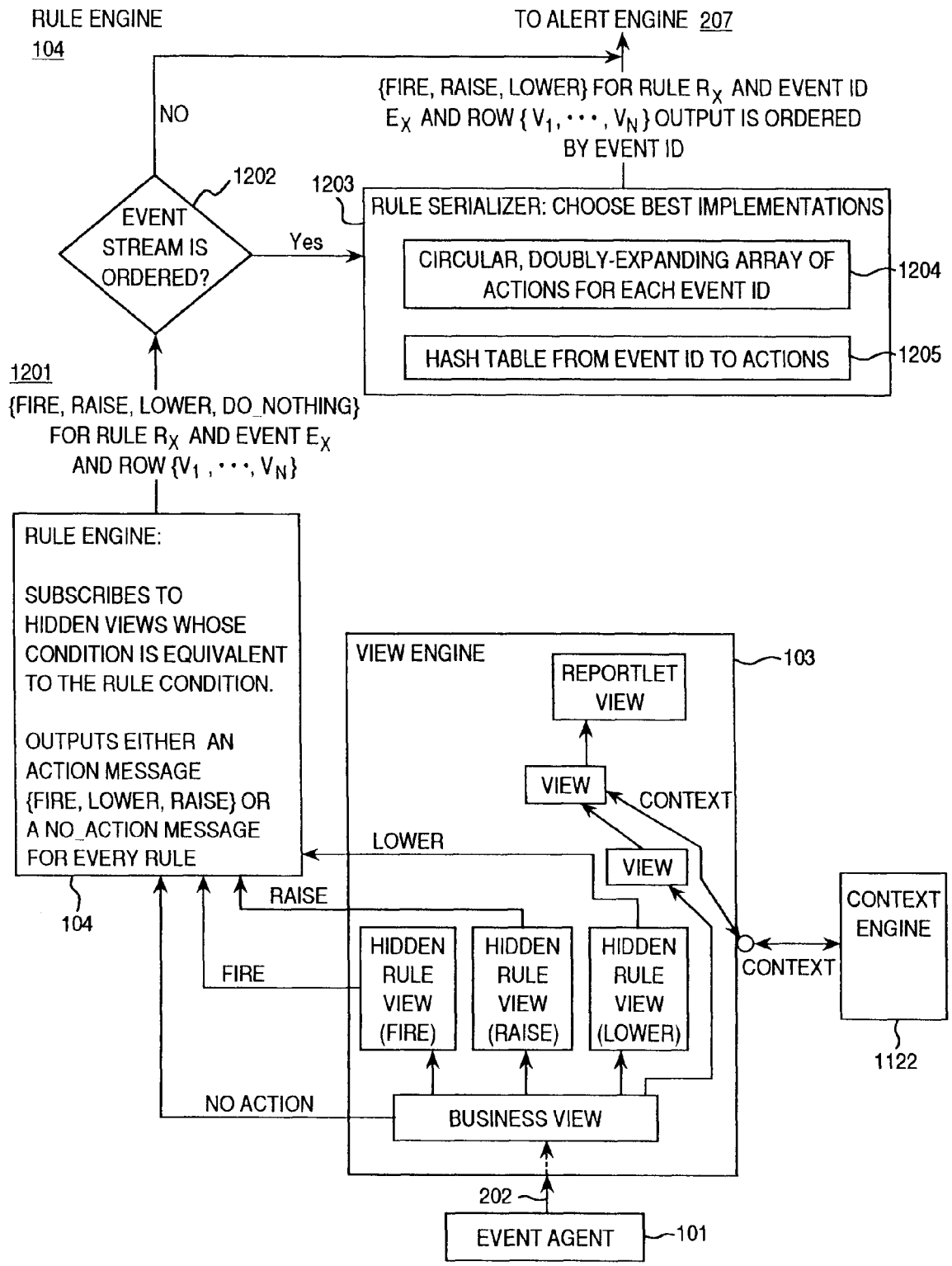
FIG. 2 depicts a rule engine, according to one embodiment of the present invention.

In step 1103, any available contexts relevant to the event are drawn by context connection 102 by context engine 1122 from a source system (e.g., source system 203; FIG. 2). In step 1104, the context engine 1122 provides the contexts to view engine 103.

View engine 103 outputs rows produced by views that it generates, which correspond to the events. In step 1105, such a view-produced corresponding to the event detected is sent to rule engine 104 and to reportlet engine 206.

In step 1106, rule engine 104 informs alert engine 207 that the rule condition is satisfied. In step 1107, reportlet engine 206 informs alert engine 207 that a reportlet corresponding to the view-produced rows are available.

In step 1108, alert engine 207 informs notification engine 208 that an alert should be fired. In step 1109, notification engine 208 sends an alert.

FIG. 2 depicts the operation of rule engine 104 for generating an action message (such as in step 1106 of process 1; FIG. 1) to alert engine 207. As described in FIG. 2, view engine 103 functions as a main memory database system that processes event streams entering the system (e.g., BAM server 100; FIG. 1), continuously maintains the views, as described above in FIG. 3.

Business users use the materialized views to define business rules. Views can comprise either business views or hidden views. The business views are the views defined by application developers and used by the business users to define business rules.

The hidden views are defined by the rule engine 104 and reportlet engine 206 for the purpose of evaluating rules. The hidden views are therefore generated by the system 100 and are not visible to the users. The hidden views are processed similarly as the business views.

An event stream thread 202 is asynchronously pushed or synchronously pulled from a source system 201. View engine 103 receives an event from event stream thread 202 of event agent 101. Context can be received by context engine 1122 to form another business view.

Rule engine 104 subscribes to the hidden rule views of view engine 103 whose condition is equivalent to a rule condition relevant to the business view. Rule engine 104 then outputs an action message 1201 where the rule is met by the business view. Action message 1201 can call for firing an alert, taking another action (such as raising or lowering the alert), or where the rule condition is not met by the business view, a message to take no action.

Action message 1201 can thus take the form '{Fire, Raise, Lower, Do_nothing} for rule $R_x$ and event Ex and row $\{V_1, \ldots, V_n\}$'. 'Fire' states that the rule condition is satisfied and that an alert should be fired. 'Raise' informs the alert engine 207 the point at which an alert should first be triggered. 'Lower' allows the system to consider resetting the point at which a subsequent alert is triggered.

Advantageously, this feature rectifies hysteresis, in which subsequent alerts can be distracting and non-informative. For example, a rule can specify that an alert fire when an event occurs, such as an inventory dropping below a certain figure, such as 100. As soon as the inventory drops to 99, the alert is triggered, allowing corresponding action to be taken. Prior to taking action, inventory may rise to 100 again and then drop to 99, triggering another alert. However, since the alert state is already "raised," another alert will not be sent.

A determination 1202 is made as to whether the event stream is ordered. If not, action message 1201 is sent directly to alert engine 207. If it is determined that the event stream is ordered, then the action message 1201 is sent to a rule serializer 1203. Rule serializer 1203 chooses the best implementation for serializing the action message.

Rule serializer 1203 can select a circular doubly-expanding array 1204 of actions for each event identifier. Alternatively, rule serializer can select a hash table from event identifiers to actions. A serialized action message 1206, ordered by event identifier, is then sent to alert engine 207.

Figure 3:
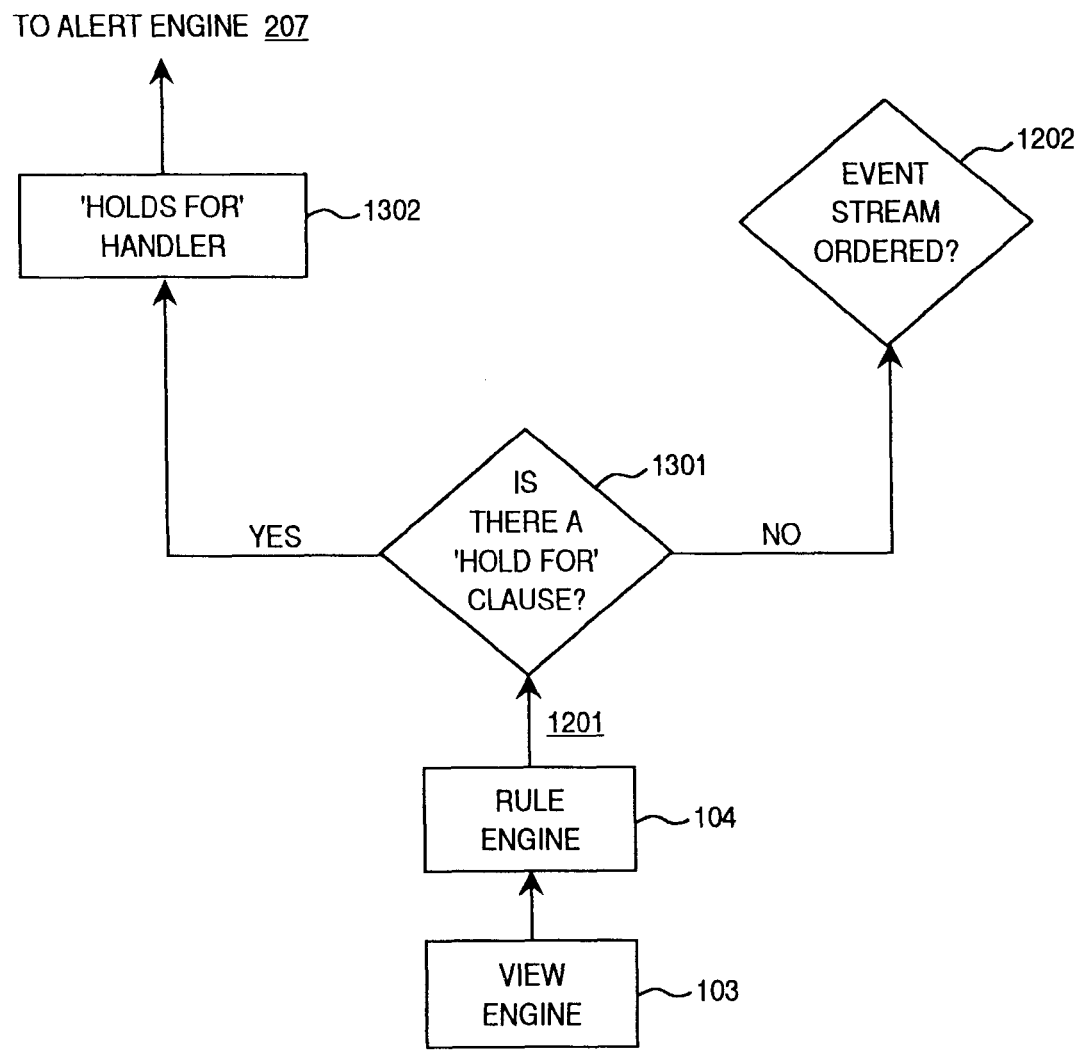
FIG. 3 depicts a rule engine holds for handler, according to one embodiment of the present invention.

FIG. 3 depicts the operation of rule engine 104 in one embodiment of the present invention. In the present embodiment, the operation of rule engine 104 corresponds to a temporally significant rule. From the hidden rules 1310 to which rule engine 104 subscribes, message 1201 is generated as described above (FIG. 12). A determination 1301 is made as to whether the message comprises a 'holds for' clause. If not, determination 1202 proceeds as described above.

If it is determined that message 1201 comprises a holds for clause, then the message is handled by a holds for handler 1302, which can operate in conjunction with a timer. Holds for handler 1302 allows generation of an alert to be forestalled until another (e.g., subsequent) particular event occurs, or cancelled if certain events occur or do not occur during a specified time duration. Upon the occurrence of the subsequent event, message 1201 is sent to alert engine 207.

Similarly, another determination can be made as to whether message 1201 comprises a 'For a specific' clause. If not, determination 1202 proceeds as described above (FIG. 12). If it is determined that message 1201 comprises a for a specific clause, then holds for handler 1302 (or a dedicated for a specific handler) tracks the Raise/Lower state for each unique tuple in a specific set of columns. Applying this to the inventory example in the Raise/Lower discussion above, the Raise/Lower state can be tracked for each specific item in the inventory.

Figure 4:
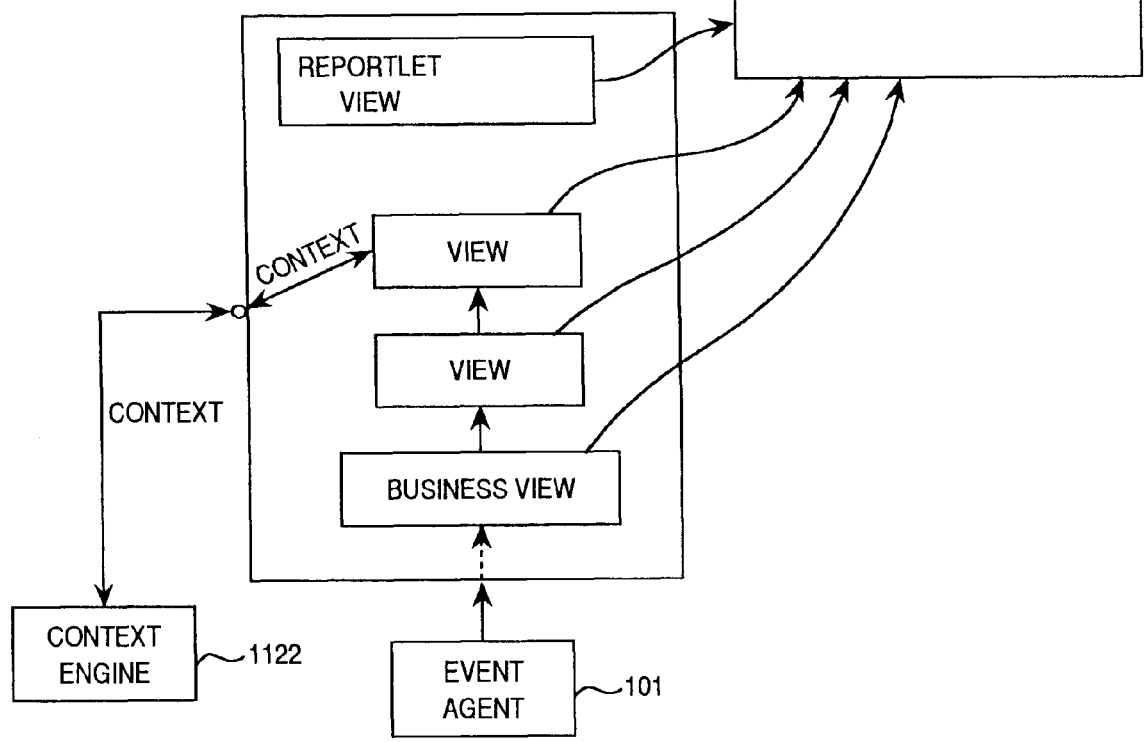
FIG. 4 depicts a reportlet engine, according to one embodiment of the present invention.

FIG. 4 depicts the operation of reportlet engine 206, according to one embodiment of the present invention. Event agent 102 provides the event to view engine 103. Any available contexts relevant to the event are provided by context engine 1122 to view engine 103. View engine 103 outputs rows produced by views that it generates, which correspond to the events.

Reportlet engine 206 subscribes to all views generated by view engine 103 that are between the business view and the reportlet view, inclusive. For every event, reportlet engine 206 outputs a reportlet or, if a particular event does not reach the reportlet view, an empty set. Available reportlets are sent to alert engine 207.

Figure 5:
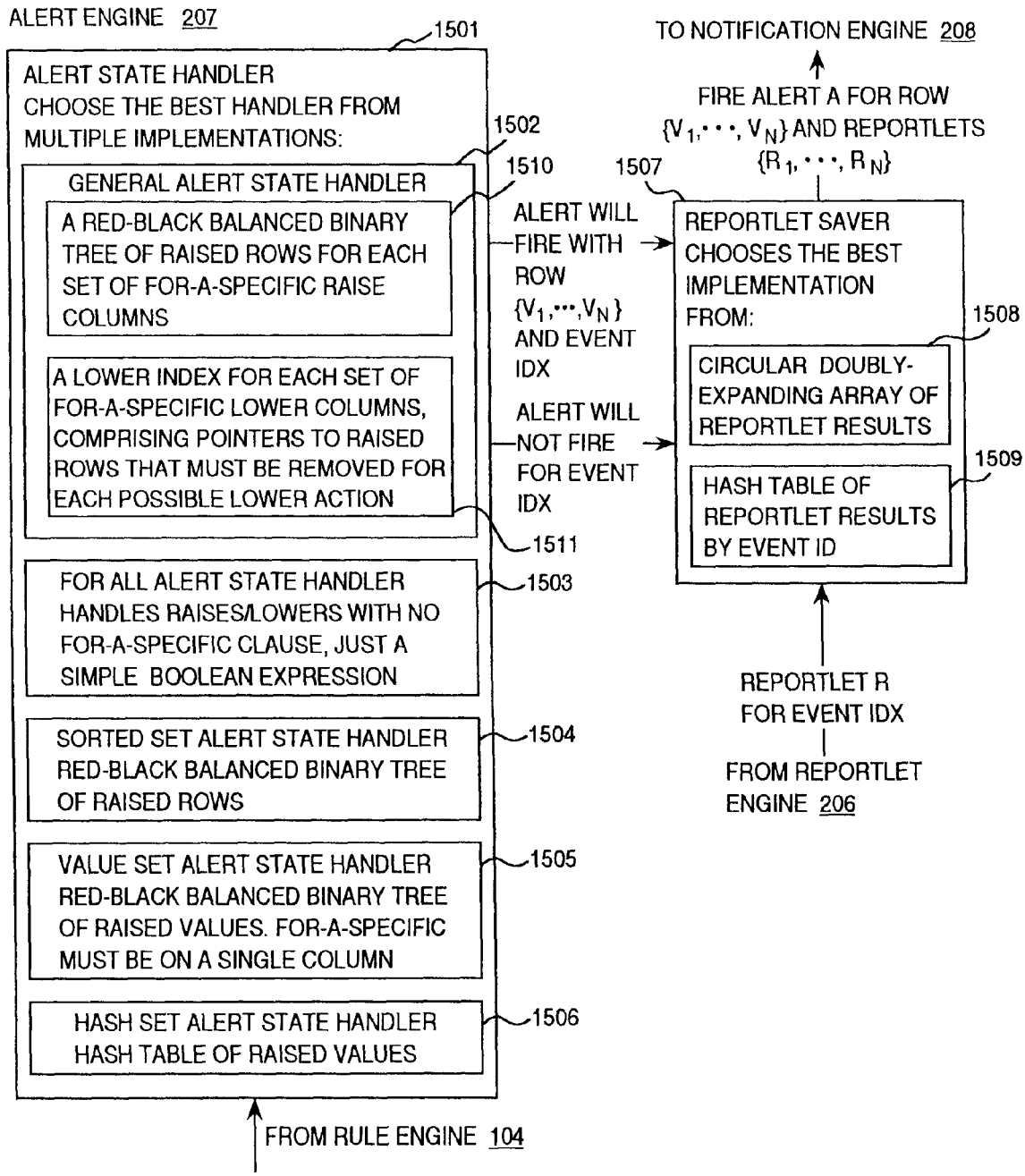
FIG. 5 depicts an alert engine, according to one embodiment of the present invention.

FIG. 5 depicts the operation of alert engine 207, according to one embodiment of the present invention. Alert engine 207 comprises an alert state handler 1501 and a reportlet saver 1507. Alert state handler 1501 receives a message published by rule engine 104 for every event. For an event $E_{x1}$, such a message can comprise a format such as 'Rule $R_{x2}$ on view $V_{x3}$ {fired, raised, lowered, will_do_nothing} for event $E_{x1}$ and Row $\{V_1, \ldots, V_n\}$ and for specific columns $\{C_1, \ldots, C_n\}$'.

To handle the alert state corresponding to this message, alert state handler 1501 chooses the best handler from amongst multiple handler implementations. The handler implementations comprising alert state handler 1501 can include generic alert state handler 1502, for all alert state handler 1503, sorted set alert state handler 1504, value set alert state handler 1505, and hash set alert state handler 1506.

Generic alert state handler 1502 comprises a red-black balanced binary tree 1510 of raised rows for each set of for-a-specific raise columns. Generic alert state handler 1502 further comprises a lower index 1511 for each set of for-a-specific lower columns. Lower index 1511 comprises pointers to raised rows, which must be removed for each possible lower action.

For all alert state handler 1503 handles raises and lowers rules with no for-a-specific clause. In one embodiment, for all alert state handler 1503 is implemented as a Boolean, which is true if the alert is in a raised state. Sorted set state handler 1504 comprises a red-black balanced binary tree of raised rows. Value set alert state handler 1505 comprises a red-black balanced binary tree of raised values wherein for-a-specific must be on a single column. Hash set alert state handler 1506 comprises a hash table of raised values.

Upon choosing the best handler for a particular set of rules and handling the corresponding alert state accordingly, alert state handler 1501 outputs a message to reportlet saver 1507. The message to reportlet saver 1507 can state, for instance, either 'Alert will not fire for event $ID_x$' or 'Alert will fire with row $\{V_1, \ldots, V_n\}$ and event $ID_x$'. Reportlet saver 1507 receives a reportlet R for event $ID_x$ from reportlet engine 206.

To handle the reportlets corresponding to event $ID_x$ with the alert state messages from alert state handler 1501, reportlet saver 1507 selects the best implementation from two choices. The implementations comprising reportlet saver 1507 include a circular doubly-expanding array 1508 of reportlet results or a hash table 1509 of reportlet results by event identifier.

Where the message from alert state handler 1501 states that 'alert will fire with row $\{V_1, \ldots, V_n\}$ and event $ID_x$', reportlet saver 1507 sends alert should be fired message 1108 to notification engine 208. Alert should be fired message 1108 can take the form 'Fire alert A for row $\{V_1, \ldots, V_n\}$ and reportlets $\{R_1, \ldots, R_n\}$'.

Figure 6:
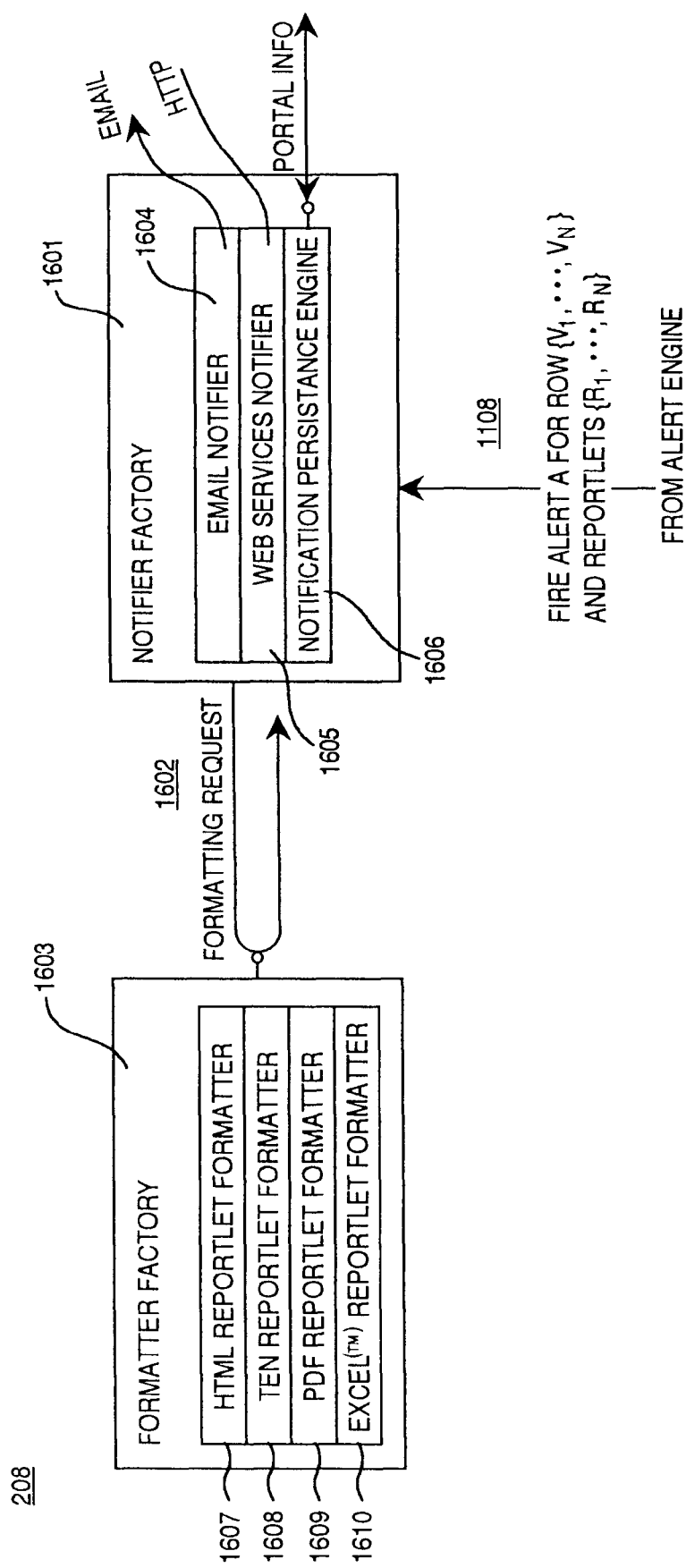
FIG. 6 depicts a notification engine, according to one embodiment of the present invention.

FIG. 6 depicts the operation of notification engine 208 by which requests such as message 1108 to format and fire an alert are handled. Notification engine 208 comprises a notifier factory 1601, which makes formatting requests 1602 to and receives corresponding formats from a formatter factory 1603.

Formatter factory 1603 comprises an HTML reportlet formatter 1607, a text formatter 1608, a PDF formatter 1609, and an Excel™ (commercially available by Microsoft, a corporation in Redmond, Wash.) formatter 1610. In one embodiment, formatter 1610 can format for other spreadsheet programs. Formatter factory 1603 can comprise other formatters, as desired for particular applications.

Notifier factory 1601 comprises an email notifier 1604, a web services notifier 1605, and a notification persistence engine 1606. Email notifier 1604 sends alerts by email. Web services notifier 1605 generates alerts in a format using open standards such as XML to allow the alert-generating web-based application (e.g., system 100; FIG. 1) to dynamically provide the alert to another web-based application with which it is "talking" (e.g., server to server). Notification persistence engine 1606 persists alerts, which can later be queried through an interface by a portal. Alerts can be presented by spreadsheet programs, as well as by voice, facsimile, wireless, a query and reporting tool, an annunciator, and a personal digital assistant, or by another network protocol.

In summary, a method for performing real-time analytics using a business rules engine on heterogeneous materialized data views is thus described. The method comprises, processing of rows produced by views corresponding to events. The rows are processed according to business rules by a view engine. Views with conditions equivalent to rule conditions are subscribed to by a rule engine, which outputs action messages corresponding to the rule condition, or a no action message. Where the rule conditions are satisfied, a statement to that effect is sent, with any available reportlets, to an alert engine. The alert engine handles alert states corresponding to the action statement, saves any corresponding reportlets, and generates a message to fire an alert to a notification engine. The notification engine formats the alert and sends the alert by a selected medium, such as email, a webpage, or a spreadsheet.

Embodiments of the present invention are directed to a method for real time analytics using a business rules engine on heterogeneous materialized data views that are both event-definitive and context-definitive. An embodiment of the present invention readily formulates and sustains a maintainable real time view of business events. Further, an embodiment of the present invention has interpretive and predictive usefulness. The method can be performed by a computer system or a network of computer systems acting under the control of computer readable and executable code embodied within a computer readable medium.

An embodiment of the present invention, a method for performing real-time analytics using a business rules engine on heterogeneous materialized data views is thus described. While the present invention has been described in particular embodiments, it should be appreciated that the present invention should not be construed as limited by such embodiments, but rather construed according to the below claims and their equivalents.

What is claimed is:

1. A method comprising:
   monitoring, by a computer, a real-time stream of data to detect a change in a value of a data element of the real-time stream of data, wherein the real-time stream of data is received from an external system;
   responsive to detecting the change, materializing a real-time view of the change;
   determining that the real-time view satisfies a rule condition of a user-defined business rule, wherein the user-defined business rule sets forth the rule condition, a subsequent particular event, and a corresponding action to be taken when the rule condition is satisfied; and
   responsive to determining that the rule condition is satisfied, triggering the corresponding action of the user-defined business rule, wherein triggering the corresponding action comprises
      selectively forestalling the corresponding action until the subsequent particular event occurs, and
      cancelling the corresponding action if the subsequent particular event does not occur during a specified time duration.

2. The method as recited in claim 1, wherein the corresponding action comprises an alert.

3. The method as recited in claim 2, wherein the alert is generated in an end user interaction system, and wherein the end user interaction system comprises a medium selected from a group consisting of e-mail, a web browser, a portal, a query and reporting tool, a spreadsheet program, voice, facsimile, wireless, an annunciator, and a personal digital assistant.

4. The method as recited in claim 1, wherein the user-defined business rule is defined using a business view and wherein the business view includes historical data.

5. The method as recited in claim 4, further comprising subscribing to a plurality of hidden views automatically generated in response to the real-time stream of data, wherein a condition of one of the plurality of hidden views is equivalent to the rule condition of the user-defined business rule.

6. The method as recited in claim 5, further comprising processing the business view and the plurality of hidden views, wherein the corresponding action describes the truthfulness of the rule condition, and wherein the corresponding action is selected from a group consisting of fire, raise, lower, and no action.

7. The method as recited in claim 6, wherein triggering of the corresponding action comprises:
   determining that the real-time stream of data is ordered; and
   serializing the corresponding action accordingly.

8. The method as recited in claim 6, wherein the processing further comprises:
   determining that the business view comprises a reportlet view; and
   responsive to determining that the business view comprises the reportlet view, outputting a reportlet corresponding to the reportlet view wherein the corresponding action includes the reportlet.

9. The method as recited in claim 6, wherein triggering the corresponding action comprises:
   publishing a message, wherein the message states that a rule on the view took an action selected from the group consisting of fired, raised, lowered, did nothing, for the event and the row and for a specified plurality of columns, wherein the group corresponds to an alert state for the business view; and
   handling the alert state, wherein the handling comprises sending a request to trigger the corresponding action and selectively sending a corresponding reportlet.

10. A method comprising:
   monitoring, by a computer, a real-time stream of data to detect a change in a value of a data element of the real-time stream of data, wherein the real-time stream of data is received from an external system;
   responsive to detecting the change, materializing a real-time view of the change;
   determining that the real-time view satisfies a rule condition of a user-defined business rule, wherein the user-defined business rule sets forth the rule condition, a subsequent particular event, and a corresponding action to be taken when the rule condition is satisfied; and responsive to determining that the rule condition is satisfied, triggering the corresponding action of the user-defined business rule, wherein triggering the corresponding action comprises tracking at least one of a raised and a lowered state for each unique tuple of a plurality of tuples, wherein each unique tuple of the plurality of tuples corresponds to one unique column of a plurality of columns of the data received from the external system, for each unique tuple of the plurality of tuples, excluding an identifier that identifies the unique column corresponding to the unique tuple from the corresponding action when the unique tuple is set to the raised state, or including the identifier that identifies the unique column corresponding to the unique tuple in the corresponding action when the unique tuple is not set to the raised state, and cancelling the corresponding action when no columns are included in the corresponding action.

11. A computer-implemented system for performing real-time analytics on heterogeneous data views, comprising:

a processor;

an agent recorded on a medium readable by the processor, the agent executed by the processor to monitor a real-time stream of data to detect a change in a value of a data element of the real-time stream of data, wherein the real-time stream of data is received from an external system;

a view engine recorded on a medium readable by the processor, the view engine executed by the processor to receive the change from the agent, to materialize a real-time view of the change, wherein the materialized real-time view comprises a business view and a hidden view, and wherein the business view is used to define a business rule;

a rule engine recorded on a medium readable by the processor, the rule engine executed by the processor to receive the materialized real-time view from the view engine, to subscribe to the hidden view, wherein the hidden view includes a condition equivalent to a rule condition of the user-defined business rule, to selectively forestall generating of an action message until a subsequent particular event occurs, and to cancel the generating of the action message if the subsequent particular event does not occur during a specified time duration;

an alert engine recorded on a medium readable by the processor, the alert engine executed by the processor to receive the action message to take an action from the view engine, to handle an alert state corresponding to the message, and to generate a request to fire an alert; and a notification engine recorded on a medium readable by the processor, the notification engine executed by the processor to receive the request from the alert engine, to format the alert as a notice, and to send the notice to a user.

12. The system as recited in claim 11, further comprising a reportlet engine recorded on a medium readable by the processor, the reportlet engine executed by the processor to receive a stream of rows from the view engine, to subscribe to a reportlet view, and to generate a reportlet corresponding to the reportlet view, wherein the alert engine receives the reportlet.

13. The system as recited in claim 11, further comprising a context engine recorded on a medium readable by the processor, the context engine executed by the processor to provide context to the view engine, wherein the context comprises historical data relevant to the materialized view, and wherein the context is added to the materialized view, and to retrieve the context from a context connection.

14. The system as recited in claim 11, wherein the rule engine is further executed to determine that the real-time stream of data is ordered and, responsive to determining, to serialize the action message.

15. The system as recited in claim 14, wherein the rule engine comprises a rule serializer for performing and serializing.

16. The system as recited in claim 15, wherein the rule serializer comprises a function selected from a group consisting of a hash table from an identifier corresponding to the change, and a circular, doubly-expanding array of the action corresponding to the change.

17. The system as recited in claim 11, wherein the alert engine performs the handling by a handler selected from a group consisting of:

a red-black balanced binary tree of raised rows corresponding to a set of 'for a specific' raise columns and a lower index corresponding to a set of 'for a specific' lower columns, wherein the lower index comprises a pointer to one of the raised rows that is removed to perform a lower action;

a red-black balanced binary tree of raised rows;

a red-black balanced binary tree of raised values wherein a 'for a specific' clause corresponds to a single column; and a hash table of raised values.

18. The system as recited in claim 11, wherein the notification engine comprises:

a notifier factory to receiving the request from the alert engine, and to send the notice to the user; and a format factory to receive a formatting request from the notifier factory, and to format the notice based on the formatting request.

19. The system as recited in claim 18, wherein the notifier notice factory comprises:

an email notifier to send the notice, wherein the notice comprises an email;

a web services notifier to send the notice to a web-based application; and a notification persistence engine to persist the notice for later querying through an interface by a portal.

20. The system as recited in claim 18, wherein the format factory comprises:

a HTML reportlet formatter;

a text reportlet formatter;

a PDF reportlet formatter; and a spreadsheet reportlet formatter.

21. A system for performing real-time analytics on heterogeneous data views, comprising:

a processor;

an agent recorded on a medium readable by the processor, the agent executed by the processor to monitor a real-time stream of data to detect a change in a value of a data element of the real-time stream of data, wherein the real-time stream of data is received from an external system;

a view engine recorded on a medium readable by the processor, the view engine executed by the processor to receive the change from the agent, to materialize a real-time view of the change, wherein the materialized real-time view comprises a business view and a hidden view, and wherein the business view is used to define a business rule;

a rule engine recorded on a medium readable by the processor, the rule engine executed by the processor to receive the materialized real-time view from the view engine, to subscribe to the hidden view, wherein the hidden view includes a condition equivalent to a rule condition of the user-defined business rule, and to generate an action message to take an action corresponding to the rule condition, wherein the rule engine is further configured to determine that the action message includes a clause to track at least one of a raised and a lowered state for each unique tuple of a plurality of tuples, wherein each unique tuple of the plurality of tuples corresponds to one unique column of a plurality of columns of the real-time stream of data received from the external system;

an alert engine recorded on a medium readable by the processor, the alert engine executed by the processor to receive the action message from the view engine, to handle an alert state corresponding to the action message, and to generate a request to fire an alert, wherein the request to fire the alert includes identifiers that identify each of the unique columns corresponding to unique tuples not having the raised stated but does not include identifiers that identify each of the unique columns corresponding to the unique tuples having the raised state; and a notification engine recorded on a medium readable by the processor, the notification engine executed by the processor to receive the request from the alert engine, to format the alert as a notice, and to send the notice to a user.

22. In a computer system for monitoring business activity, a computer-readable storage medium having a computer-readable program code embodied therein for causing the computer system to:

monitor a real-time stream of data to detect a change in a value of a data element of the real-time stream of data, wherein the real-time stream of data is received from an external system;

responsive to detecting the change, materialize a real-time view of the change, wherein the materialized real-time view comprises a business view and a hidden view, and wherein the business view is used to define a business rule;

subscribe to the hidden view, wherein the hidden view includes a condition equivalent to a rule condition of the user-defined business rule;

selectively forestall generating an action message until a subsequent particular event occurs;

cancel the generating of the action message when the subsequent particular event does not occur during a specified time duration;

handle an alert state corresponding to the message;

request that an alert be fired;

format the alert as a notice; and send the notice to a user.

23. The computer-readable storage medium as recited in claim 22, wherein the computer-readable program code further causes the computer system to:

where the materialized real-time view includes a reportlet view, generate a reportlet corresponding to the reportlet view, wherein the notice includes the reportlet.

24. The computer-readable storage medium as recited in claim 22, wherein the computer-readable program code further causes the computer system to add historical data relevant to the materialized real-time view.

25. The computer-readable storage medium as recited in claim 22, wherein the computer-readable program code causes the computer system to determine that the real-time stream of data is ordered, and serialize the action message.

26. In a computer system for monitoring business activity, a computer-readable storage medium having a computer readable program code embodied therein for causing the computer system to:

monitor a real-time stream of data to detect a change in a value of a data element of the real-time stream of data, wherein the real-time stream of data is received from an external system;

responsive to detecting the change, materialize a real-time view of the change, wherein the materialized real-time view comprises a business view and a hidden view, and wherein the business view is used to define a business rule;

subscribe to the hidden view, wherein the hidden view includes a condition equivalent to a rule condition of the user-defined business rule;

generate an action message to take an action corresponding to the rule condition specified by the user-defined business rule based upon the received real-time stream of data;

determine that the action message includes a clause to track at least one of a raised and a lowered state for each unique tuple of a plurality of tuples;

handle an alert state corresponding to the message;

request that an alert be fired;

format the alert as a notice; and send the notice to a user.

* * * * *